Dec. 19, 1967 K. F. STULTZ ET AL 3,359,376

OPTICAL HIGH-FIDELITY PLAYER ARRANGEMENT

Filed Dec. 6, 1963 2 Sheets-Sheet 1

KEITH F. STULTZ
HANS J. ZWEIG
INVENTORS

BY R. Frank Smith
David P. Ogden

ATTORNEYS

Dec. 19, 1967 K. F. STULTZ ET AL 3,359,376

OPTICAL HIGH-FIDELITY PLAYER ARRANGEMENT

Filed Dec. 6, 1963 2 Sheets-Sheet 2

KEITH F. STULTZ
HANS J. ZWEIG
INVENTORS

BY R. Frank Smith
David P. Ogden

ATTORNEYS

United States Patent Office 3,359,376

Patented Dec. 19, 1967

3,359,376
OPTICAL HIGH-FIDELITY PLAYER ARRANGEMENT

Keith F. Stultz, Rochester, N.Y., and Hans J. Zweig, Los Angeles, Calif., assignors to Eastman Kodak Company, Rochester, N.Y., a corporation of New Jersey Filed Dec. 6, 1963, Ser. No. 328,642
4 Claims. (Cl. 179—100.3)

The present invention relates to an optical high-fidelity player arrangement and more particularly to a high-fidelity player arranged to derive signal information from an encoded film and the method of operating it.

In the art of high-fidelity reproduction equipment a great deal of effort has been expended on various pickup means to attain sharp focusing of the detector means, such as a needle or a magnetic pickup head, on the recording medium. For instance, a considerable effort has been expended on reduction of size of magnetic pickup means, on changes of orientation, on increase in speed of tape travel across the pickup head, etc., to attain extremely high fidelity. If it were practicable to focus the magnetic field, it would of course be convenient to remove the magnetic pickup head slightly from the recording medium whereby its size would be of little consequence. However, this has not been achieved. That is, the size of the magnetic pickup head limits the speed and fidelity of a magnetic recording. Contact recording, such as use of sharp diamond needles on relatively rigid sound track disc records, has a distinct disadvantage of wear of both the needle and the recording. We have found that by use of a substantially different recording medium these problems which tend to increase the cost and limit the range of high fidelity equipment, may be avoided. Further, the range of fidelity equipment may be substantially increased and wear of the signal information itself substantially reduced.

Therefore, an object of the present invention is to provide an improved high fidelity player arrangement.

A more specific object of the present invention is to provide an optical high fidelity player arrangement wherein the recording medium and the pickup means are coupled only by light flux.

A further object is to provide an improved method of reproducing sound recordings.

In accordance with one embodiment of our invention, an audio signal is sampled at regular intervals, such as 20,000 samples per second. The amplitude detected at each sampling is then quantitized by pulse code modulation techniques to develop primary signals with sufficient, discrete amplitude levels to provide substantial modulation of an output signal. This signal is then recorded on a photographic medium, such as a disc or a film strip, and after this medium is developed it will modulate a light flux signal passed therethrough to provide signal information corresponding to the audio signal information but in the form of modulated light transmission.

In one form, the optical record player itself comprises a light source which is directed through the recording medium during its traversal of the light flux. A sensing device such as a photodetector arrangement, such as a photodiode or a phototransistor, receives all light transmitted to develop an electric signal in accordance with the magnitude of such light. This signal, when amplified by electronic circuits, will provide sufficient energy to drive a utilization device such as an audio speaker. In accordance with one specific arrangement, each digit of a series of digit numbers is separately detected. One detection means suitable for use with very small digit windows is one comprising fiber optics with each fiber arranged to energize similar photosensitive transducers, respectively. The output from the various transducers is then proportionately added in a decoding arrangement whereby the original audio signal information is reconstituted.

Alternately, a complete digit number composed of several digits may be illuminated with the light flux passing through a decoding optical system such as a light control optical wedge or mask to a single photodetector which combines the light flux of the several digits of the digit number and attains an analog number proportional to the sum thereof. A single photodetector receptive of such a light signal is coupled to energize relatively conventional audio amplifier and speaker systems. The use of such an optical wedge for discriminating between the several digits of a digit number is explained in some detail in our copending application for Letters Patent of the United States, Ser. No. 297,262, filed July 24, 1963 and which has since issued as Patent No. 3,271,758, assigned to the assignee of the present case.

The subject matter which is regarded as our invention is particularly pointed out and distinctly claimed in the concluding portion of this specification. The invention, however, as to its organization and operation, together with further objects and advantages thereof, will best be understood by reference to the following description taken in connection with the accompanying drawings in which:

Figure 1:
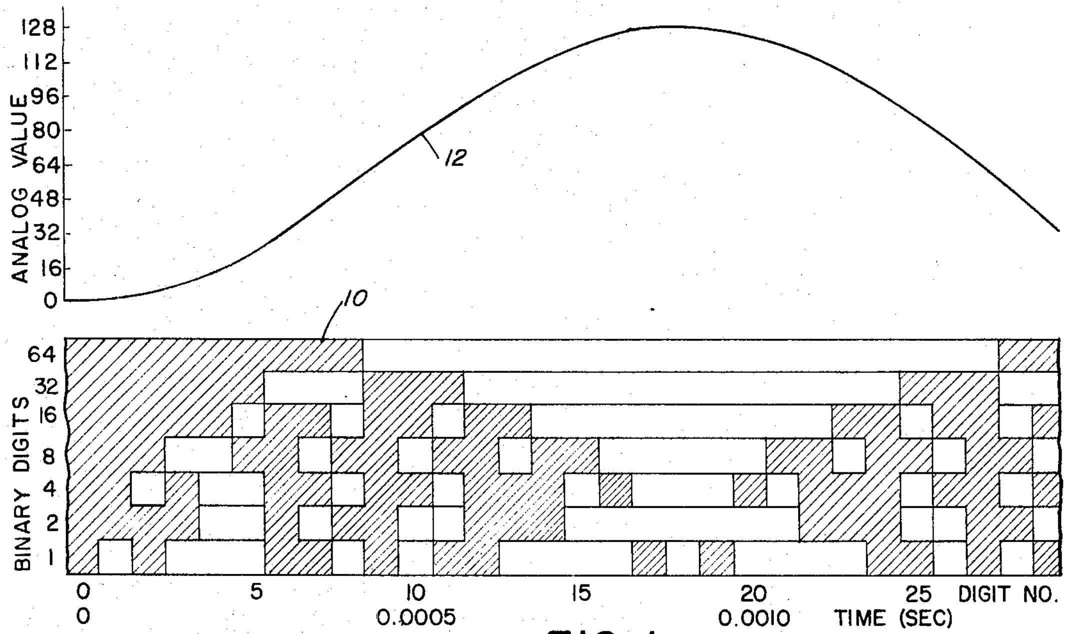
FIG. 1 is a schematic view of a series of photographically stored 7-digit binary numbers along with a graphic illustration of the magnitude of the signal developed by passage of light therethrough.

Referring now to the drawings wherein like numbers refer to similar parts, we have shown in FIG. 1 a digital strip of film 10 having binary numbers 1, 2, 3, 4, 5, etc. thereon, each composed of seven digits and arranged to provide signal information of decimal (analog) magnitude variation from 1 to 127. Obviously, more or fewer digits may be used depending on the fidelity requirements. Similarly, a ternary or other code may be used to provide greater range.

As indicated in FIG. 1, the film strip 10 is provided with opaque regions and transparent regions. Obviously, black-and-white prints might also be used as well as encoded transparent films if the light is reflected therefrom to a detector. Similarly, the filmstrip may be spiraled to take the form of a disc. In either case, means must be provided to align the optical system with each digit number. In the case of a lineal filmstrip, it is guided past the detection device, while a disc may be provided with a guiding spiral groove. Also in the case of a disc, it will often be most feasible to use a positive print reflection illuminating arrangement whereby the illuminating means may be mounted on the pickup arm of the record player.

In the filmstrip 10, shown in FIG. 1, the digit number 1 has an analog value of 1; the digit number 2 has an analog value of 4; the digit numbers 3, 4, 5, etc., correspond to 9, 15, 23, 32, 42, 53, 64, 75, etc., and when plotted in analog form represent a sinusoidal wave form 12. The ordinate scale of this wave form 12 has a range (in analog or decimal values) from 0 to 127 and the abscissa scale is time in seconds. With the present invention arranged to sample 20,000 digit numbers per second, twenty of the digit numbers, as indicated, will be sampled in 0.001 second. The particular frequency thus illustrated is about 555 cycles per second, which is clearly within the audio range. The reproduction of this tone results from a total of 36 samples per cycle.

It should be apparent, other frequencies may be encoded on the filmstrip 10 and these frequencies need not necessarily be pure sinusoidal waves but may be more complex sound waves including harmonics. Also, accurate reproduction of a tone may be accomplished with less than 36 samples, and the scanning frequency rate can be set as low as 10,000 or substantially above the 20,000 per second suggested depending on the quality of signal required to attain an acceptable output signal from this system.

Figure 2:
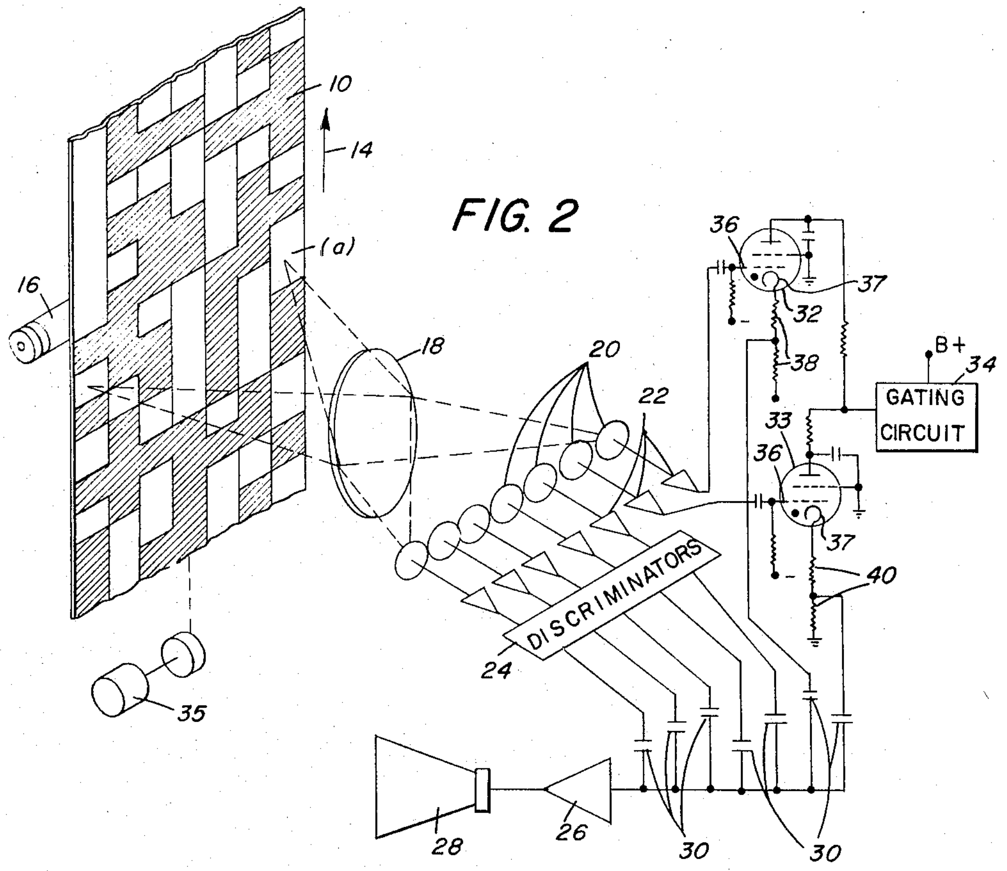
FIG. 2 is a schematic illustration in perspective of a means for optically reading the binary encoded filmstrip of the type shown in FIG. 1.

Referring now to FIG. 2, we have shown one arrangement for scanning the filmstrip 10 as it moves in a direction indicated by an arrow 14. A lamp 16 illuminates a digit number indicated at A. The light transmittance of the digit number A is focused by a lens system 18 on a series of photodetectors 20 with the number of photodetectors being equal to the number of digits in each digit number. The output of these photodetectors is amplified in amplifiers as indicated at 22 and coupled by discriminators 24 to an audio amplifier 26 and then to a utilization device such as a loudspeaker 28. Obviously several types of amplifiers 22 might be used with a simple triode circuit operated in Class C amplification providing useful signal information which is clipped or otherwise reduced to a proper magnitude in accordance with the digital value of the digit window transmitting the light flux. One suitable clipping circuit includes a resistor-capacitor network with the capacitors being indicated at 30.

However, because of possible variation of the output of the simple triode Class C operation, it may sometimes be feasible to use a more sophisticated arrangement illustrated as thyratron gas-filled tubes 32 and 33. These tubes are energized from a B+ voltage through a gating circuit 34 which applies plate voltage to the tubes at frequency of 20,000 cycles per second in accordance with the velocity of the filmstrip 10 as established by a takeup drive means of the type used on magnetic tape machine or movie projector and indicated at 35. A similar gating arrangement may be placed in the trigger circuit of these tubes illustrated as a trigger grid 36, with the gating voltage applying a threshold voltage to the tubes whereby a trigger pulse from the amplifiers 22 will fire them. However, when using threshold synchronization, the tubes 32 and 33 must be of the self-quenching type.

The power output of these amplifier tubes is taken from the cathode 37 in a cathode follower type arrangement wherein a resistance divider network 38 provides a preselected voltage across the capacitor 30 of tube 32 and a voltage divider network 40 provides a different voltage across the capacitor 30 of the tube 33. The voltage divider networks as illustrated at 38 and 40 are selected to distinguish between the several digits of each digit number. Thus the smallest digit is provided with a voltage network which provides a one-unit signal, the next digit provides a two-unit signal, the next digit provides a four-unit signal, etc., as is well known in binary signal handling techniques. The output of these several circuits as indicated by the arrangement of the coupling capacitors 30 is transmitted to the amplifier 26 which accumulates all of the signals and provides an analog signal corresponding to the encoded digit number A being sample. Thus, when the particular filmstrip 10 shown in FIG. 1 is scanned by the arrangement shown in FIG. 2 at 20,000 samples per second, a tone of about 555 cycles per second is emitted by the speaker 28.

Figure 3:
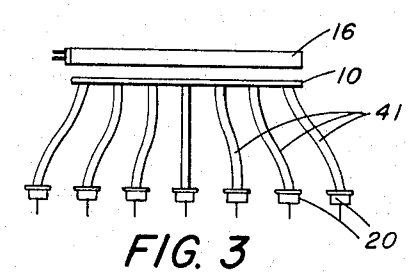
FIG. 3 is a schematic illustration of another optical system usable with the arrangement shown in FIGS. 2 and 4.

Referring now to FIG. 3, another embodiment of our invention is illustrated wherein the lens arrangement takes the form of fiber optics with each fiber 41 coupling one digit to its corresponding photocell 20. This arrangement is particularly useful for optical scanning of any kind of optically recorded information such as binary numbers having a dimension of a few thousandths of an inch.

Figure 4:
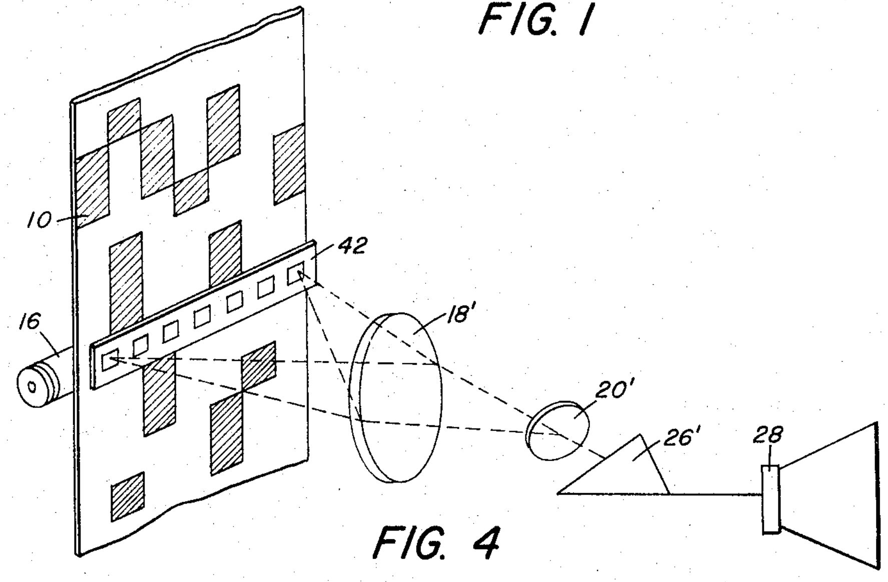
FIG. 4 is a schematic illustration in perspective of another arrangement for reading by means of an optical discriminating arrangement, digital information encoded on a film.

Referring now to FIG. 4, a slightly different arrangement is provided for reading the digitally encoded filmstrip 10. The lamp 16 of FIG. 4 is substantially identical with the lamp 16 of FIG. 2. However, the discrimination of the several digits of each digit number is accomplished in accordance with a density wedge or a mask 42 with a lens system 18' and a single photodetector 20' cooperating to accumulate the signal information of the several digits of a digit number. The amplifier 26' and the speaker 28 are comparable to those shown in FIG. 2. However, in this arrangement great care must be taken in correlating the luminosity of the lamp 16 and the density wedge 42, so that the signal developed by the photodetector 20' is an actual, accurate reproduction of the signal encoded on the filmstrip 10. Several solutions to this problem are explained in some detail in our above-mentioned patent application.

In the arrangement of FIG. 4, the wedge 42 may be placed within a compound lens system to accomplish discrimination. With such a placement, the wedge 42 may be positioned to intercept an image several times larger than the width of a digit number itself. Such an arrangement tends to facilitate calibration. When using fiber optics, the wedge 42 may be placed within a break in the fibers 41, or secured directly to the fibers respectively.

Also, the fiber optics arrangement may be used as a part of a discriminating arrangement. For instance, the size or number of the fibers as well as their effective density may be varied to discriminate between the analog values of the several digits of each digit number.

While we have shown and described particular embodiments of our invention, other modifications may occur to those skilled in this art. For instance, instead of simultaneously scanning all digits of a digit number, raster scanning may be employed. Although raster scanning provides various advantages, it requires a somewhat more complex lens arrangement than those set forth above. Also the 20,000 per second sampling rate can be accomplished by repetitively illuminating the digit numbers at this rate by means of shutters of a strobe light. We intend by the appended claims to cover all modifications which fall within the true spirit and scope of this invention.

We claim:

1. An optical high-fidelity player arrangement for reproducing signal information optically encoded in the form of a series of digit numbers, comprising:
   - means for illuminating the digit numbers;
   - detector means;
   - means for optically coupling said detector means to the digit numbers to detect the luminosity thereof in response to said illuminating means;
   - means for driving the series of digit numbers past said illuminating and coupling means at a rate of the order of 20,000 numbers per second for sampling the individual numbers at a corresponding rate,
   - said detector means comprising a plurality of photoelectric detectors, one corresponding to each digit of a number in said series,
   - discriminator means comprising a plurality of bistable electronic devices, one corresponding to each of said detectors, each such device adapted, when in a first stable state, to respond to the output from its associated detector upon sensing of a digit thereby to change from said first stable state to a second stable state wherein it produces an output signal proportional to the analog value of that particular digit,
   - gating means operable in timed relationship with said driving means for cyclically causing all of said electronic devices to be set to said first stable state at the beginning of each number-sampling period,
   - and signal reproducing means conjointly responsive to the outputs from all of said electronic devices for producing a combined output corresponding to the analog signal represented by said encoded series of numbers.

2. The invention according to claim 1 wherein each of said electronic devices comprises a thyratron having at least an anode, a cathode and a trigger electrode, each of said detectors being operatively connected to the trigger electrode of the corresponding thyratron whereby to cause said thyratron to become conducting in response to output from its associated detector.

3. The invention according to claim 2 wherein each of said electronic devices includes impedance means in the anode-cathode circuit thereof arranged, when said thyratron is conducting, to produce an output voltage thereacross proportional to the analog value of the corresponding digit, and a capacitor for coupling said output voltage to said signal reproducing means.

4. The invention according to claim 2 wherein said gating means cyclically applies and removes operating potential for said thyratron.

References Cited

UNITED STATES PATENTS

| | | | |
|---|---|---|---|
| 2,616,983 | 11/1952 | Zworykin et al. | 179—100.3 |
| 2,678,254 | 5/1954 | Schenck | 179—100.3 |
| 3,043,962 | 6/1962 | Jones | 340—347.4 |

TERRELL W. FEARS, *Primary Examiner.*

IRVING SRAGOW, *Examiner.*

G. LIEBERSTEIN, *Assistant Examiner.*